Figure 1:
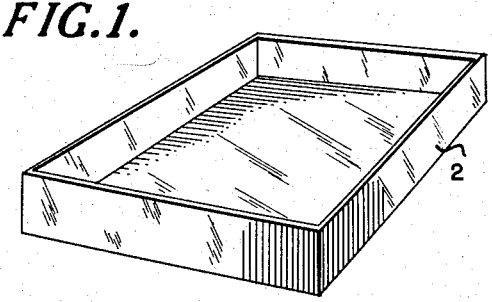

March 17, 1959 W. C. RAINER ET AL 2,878,174
POLYETHYLENE
Filed June 6, 1955

INVENTORS
WILLIAM C. RAINER
EDWARD M. REDDING
AURTHUR W. SLOAN
WILLIAM D. STEWART
JOSEPH J. HITOP
BY
Cushman, Darby & Cushman
ATTORNEYS

2,878,174

POLYETHYLENE

William C. Rainer, Edward M. Redding, and Joseph J. Hitov, Baltimore, Md., and Arthur W. Sloan and William D. Stewart, Alexandria, Va., assignors, by mesne assignments, to W. R. Grace & Co., Cambridge, Mass., a corporation of Connecticut Application June 6, 1955, Serial No. 513,252

12 Claims. (Cl. 204—154)

The present invention relates to polyethylene.

Polyethylene is widely used today in making containers, e. g., squeeze bottles, toys, film packaging materials, etc. Despite its many advantages in these and other uses, it suffers from the disadvantage that it is normally translucent or opaque rather than transparent in appearance at room temperature and, hence, cannot be used in applications where a clear, water-white material is desired.

It is known that solid polyethylene can be physically transformed into a clear, transparent plastic or liquid, when elevated to its transition point, which is approximately 105° to 125° C. However, this transparency is normally lost upon cooling, unless special methods are employed and, even with such special methods, the transparency is not retained if the polymer is reheated to its transition point and slowly cooled. The transition point of polyethylene is commonly referred to as its transparent or softening temperature. There also is some variation in transition point, depending on the average molecular weight of the polymer. With a molecular weight of about 20,000, the melting point is generally about 110° C.

In the past, it has been proposed to make transparent polyethylene film by heating polyethylene and then quick cooling the same to room temperature or below. Alternatively, it has been suggested to obtain transparency by stretching the polyethylene. These procedures, while giving transparent polyethylene, suffer from the disadvantage that this transparency is not retained if the polyethylene is submitted, for example, to further physical changes, such as heating and slow cooling and, it has not proven feasible to retain the clarity during subsequent shaping operations.

Accordingly, it is a primary object of the invention to prepare a polyethylene which remains clear and transparent, e. g., water-white, regardless of change in physical form. For example, films of such clear and transparent polyethylene can, by irradiation, if the irradiation is not carried out to too great an extent, be heated to at least its original transition point, molded into desired shape and then cooled to form a new product which retains the clarity and transparency of the original film.

It is a further object of the invention to prepare a polyethylene which can be molded by conventional transfer, compression and injection molding and extrusion procedures to obtain a clear, water-white product.

Another object of the invention is to prepare a clear, water-white polyethylene of increased strength and toughness.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained and transparent, substantially colorless, i. e., water-white, solid polyethylene, also having increased strength and toughness, can be prepared in a form which can be reproduced, regardless of the subsequent physical change of the polyethylene, by irradiating the polyethylene while in a clear and transparent condition at a temperature of at least about its transition point. The polyethylene employed should be one which is solid at room temperature and has a molecular weight of 7,000; 12,000; 19,000; 21,000; 24,000; 30,000; 35,000, or even higher. For many useful results, the molecular weight should be at least 12,000 and, preferably about 20,000 to 28,000.

It is surprising that irradiation will set or fix the clarity of the polyethylene as related herein.

The following examples illustrate typical methods of carrying out the invention.

Example I

A Van de Graff electrostatic generator, manufactured by the High-Voltage Engineering Corporation, Cambridge, Massachusetts, was used as a source of a beam of electrons. This machine is a high voltage X-ray generator and was modified by removal of the tungsten target from the path of the electrons to permit thereby irradiation of objects at the port. The generator was operated at two million volts with an amperage of 100 to 150 microamps (D. C.) at the target area of approximately 25 sq. inch. The dosage for the irradiated disks of polyethylene of approximately 1 sq. inch was 8 watts.

Procedure: A strip heater, equipped with a Variac, was fitted with a clamp to hold a flat Vycor glass crucible cover. The crucible cover was the container for the polyethylene. The Variac was adjusted to give a melt temperature of 120° to 130° C. (previously measured by a thermocouple), and held at this temperature. Samples of polyethylene with a molecular weight of about 20,000 (Du Pont's PM–1), in the form of disks $(a)$, $(b)$, $(c)$, and $(d)$, each disk being one inch in diameter and 0.010 inch thick, were inserted into separate Vycor dishes and heated to the transparent point. This required about 30 seconds for each sample. The dishes were then inserted at the port of the machine, centered and irradiated. Exposure periods for irradiation for the molten polyethylene were:

Sample $(a)$ 2 seconds
Sample $(b)$ 10 seconds
Sample $(c)$ 30 seconds
Sample $(d)$ 60 seconds After irradiation, the hot samples in the Vycor dishes were allowed to cool to room temperature and were then stripped from the dishes.

In each of $(a)$, $(b)$, $(c)$ and $(d)$, the product was a clear, substantially water-white, transparent solid which could be reheated to the original transparent point of the polyethylene and recooled.

As blanks for comparison, there were employed disks of identical dimensions prepared from the same translucent sheet of polyethylene and irradiated at varying time intervals from 2 to 60 seconds in the above manner, but without the use of heat. The blank products in each case retained their translucent features and, upon heating to the transparent point and recooling, were not improved in this respect.

In the hot melt experiments of Example I, the clear glass darkened considerably in color. In Example I$(a)$, the polyethylene was quenched immediately after the irradiation by quenching in an ice bath at about 2° C. Especially satisfactory results have been obtained with this quick quenching procedure. Quenching, generally, requires a few seconds, e. g., 2 or 3 seconds, and normally, less than 5 seconds. By quenching is intended to include cooling to below the transition point rapidly, as just indicated.

*Example II*

The process described in Example I was repeated, using a polyethylene of a molecular weight of about 20,000 to determine the amount of irradiation necessary to obtain clarity. Samples were placed on a strip heater, which was positioned to travel on a conveyor forwards and backwards under the irradiation beam. Each passage under the beam supplied a dosage of $2 \times 10^6$ R.E.P. to the polyethylene. Specifically, the milk-colored (translucent) polyethylene was rendered clear by raising its temperature to about 125° C. (which is beyond its transition point). While still in the hot transparent state, it was structurally modified through ionization under the incident influence of the 2 m.e.v. beam of the generator recited in Example I, at various dosage levels. The polyethylene was removed from the heater and allowed to cool gradually to room temperature without the application of cooling aids.

The original milkiness gave way to transparency in the cooled samples of irradiated polymer in varying degrees, depending on the quantity of irradiation absorbed. At a dosage level of $2 \times 10^6$ R.E.P., this increase in transparency first became evident to a significant amount. At $6 \times 10^6$ R.E.P., it is pronounced. In ascending order of dosage, this transparency is progressively enhanced, being quite good at $20 \times 10^6$ R.E.P., until at $52 \times 10^6$ R.E.P., a mere trace of translucency remains. At an even higher dosage, e. g., 75 to $100 \times 10^6$ R.E.P., even this trace disappeared and the polyethylene became manifestly water clear.

R.E.P., as is recognized in the art, is defined as that amount of nuclear radiation which dissipates 93 ergs of energy per gram of tissue producing $1.61 \times 10^{12}$ ion pairs in the process. It is approximately equal to the amount of energy that would be dissipated by a one roentgen X-ray beam in a gram of tissue.

As the amount of irradiation dosage administered is increased, the polyethylene diminishes in thermoplasticity until, finally, transformation is effected into a thermosetting plastic.

The process disclosed in the examples consists of heating the polyethylene to at least its transition point, i. e., to the transparent or softening temperature. This is followed by irradiation while in the mobile plastic condition. The product is then cooled, either rapidly or slowly, e. g., either rapidly to 2° C., or rapidly to 20° C., or slowly to room temperature.

The term "melt-irradiated," unless otherwise indicated, is employed to describe polyethylene which has been subjected to a high voltage electron beam at or beyond its transition or transparent point and, which, as a result, retains wholly or in part the water-clear transparency of the mobile, plastic phase after slow or gradual reduction to room temperature conditions.

It is possible to shape the irradiated polyethylene while it is still in the hot, clear state and, thereafter, cool the product as in Example I. Thus, in Example I(d), the sample can be formed into a button or a crown cap liner, while still in the hot, clear state, e. g., by compression molding, and is then allowed to cool slowly to obtain a substantially clear button or cap liner at room temperature.

If desired, the irradiated polyethylene of Examples I(a) through (d), either in the hot or cold state, could be formed into particles in the customary manner by extruding and chopping and then, the pellets so formed, subsequently reheated and formed into films or other shapes. The resulting products retained their transparency, in contrast to conventionally prepared polyethylene. Specifically, the product of Example I(b), after cooling to room temperature, could be reheated to at least the hot, clear point, molded in the form of a cup and then cooled, either slowly or by quenching, to room temperature to give a substantially clear cup in each case.

If the polyethylene has been irradiated to the point where the desired degree of clarity is obtained upon slow cooling, there is no need to cool rapidly. However, if the irradiation is carried out to a more limited extent, so that the polyethylene will not retain sufficient clarity upon slow cooling, then rapid cooling or quenching must be resorted to, in order to maintain the desired clarity. Otherwise, clarity may only be retained to an extent of 90% or less, depending upon the amount of irradiation.

The degree of cross-linking developed in melt irradiated polyethylene beyond the $50 \times 10^6$ REP level does not lend itself easily to subsequent working. It is therefore, desirable, but not necessary, to confine transfer, compression and injection molding and extrusion procedures to polyethylene which has been melt irradiated at dosage levels not over $50 \times 10^6$ REP. Since, however, the molded piece, e. g., a ribbon, container, closure, etc. may not possess the ultimate in degree of transparency, if allowed to cool slowly, for the reasons previously set forth, recourse may be had to rapid cooling after the product has been reheated to the original temperature of full clarity, in order to remove the last traces of translucency. When the clear, irradiated polyethylene, for example, sheet or film stock, is heated above the transition temperature of the original non-irradiated polyethylene, it still retains its shape and may, therefore, be formed by such methods as vacuum or pressure molding with the additional advantage of much greater latitude in the speed of operation since the sheet may be heated to forming temperatures prior to insertion over the mold cavity. The non-irradiated polyethylene, on the other hand, must be placed over the mold cavity prior to heating to the forming temperature, since the sheet at this temperature is in a mobile, plastic condition.

As previously mentioned, if the irradiated polyethylene has an incident dosage of from 2 to about $50 \times 10^6$ REP, it is possible to use conventional molding operations and still retain a clear product. With a treatment of $50 \times 10^6$ REP or above, e. g., $100 \times 10^6$ REP, pressure and vacuum post forming of the polyethylene sheets is still practical as with other types of thermosetting resin.

A dosage of about $20 \times 10^6$ REP has been found to be preferred since, with this dosage, a product is obtained which has excellent clarity and also can be subsequently readily molded, after either slow or quick cooling.

The time of irradiation under the incident beam, while not critical, as long as sufficient dosage is absorbed, can vary between 0.75 second and 75.0 seconds, preferably between 7.5 and 45.0 seconds. These figures are based on a 2-m. e. v. Van de Graff electrostatic generator, producing 41 microamps per inch of scan, impinging on a sample as it passes under the electron beam on a moving conveyor travelling at the rate of 40 inches per minute. For each pass under the electron beam, which requires 0.75 second, an irradiation dose of $2 \times 10^6$ REP is delivered to the sample.

The voltage of the electrostatic generator can also vary quite widely and can be 750,000 or 1,000,000 or 2,000,000 or 3,000,000 or even 6,000,000 volts or higher, depending on the thickness of the sample to be irradiated.

The polyethylene treated by irradiation, developed by a 2 m. e. v. machine, can have a thickness from 1 to 250 mils, but is preferably about 40 to 50 mils. For thicknesses above 250 mils, the voltage should be above 2,000,000.

The irradiation of polyethylene, which has been heated to its transition point when it is crystal clear, poses a problem of blistering from the gases evolved as a result of electron bombardment. Sheets of polyethylene, irradiated initially in the mobile, plastic state, become disfigured throughout by the formation of these blisters which remain after removal from the electron beam and cooling to room temperature, even though the resultant sample is transparent. Non-irradiated polyethylene at its transition point has little or no strength to resist the formation of blisters. It has now been found that, if polyethylene is first subjected to a definite minimum irradiation dose below its transition point, where it does have adequate strength, and then heated to or above its clear point, which is approximately its original transition point, at which point it now possesses considerable strength, and is then irradiated further, while at this elevated temperature, blisters will no longer form. This effect is shown in the following example.

*Example III*

To demonstrate more effectively the differences in appearance before and after irradiation at 120° F., polyethylene DYNH (Bakelite) of approximately 21,000 molecular weight, which was white opaque in sheet form at a thickness of 0.140" to 0.170", was used in this experiment.

| Code | Initial Dosage at room temp. | Final dosage at 120° C. | Appearance after cooling to room temp. |
|---|---|---|---|
| 24A [1] | 12×10⁶ REP | 36×10⁶ REP | Frosty opaque; Many blisters. |
| 25A [1] | 16×10⁶ REP | 36×10⁶ REP | Same. |
| 26A [1] | 20×10⁶ REP | 10×10⁶ REP | Milky opaque; Many small blisters. |
| 27A [1] | 28×10⁶ REP | 10×10⁶ REP | Same. |
| 28A | 40×10⁶ REP | 50×10⁶ REP | Transparent; Reduced number of blisters. |
| 29A | 52×10⁶ REP | 50×10⁶ REP | Best transparency; several blisters (less than 28A). |
| 30A | 76×10⁶ REP | 50×10⁶ REP | Transparent; No blisters. |
| 31A | 100×10⁶ REP | 50×10⁶ REP | Transparent—No blisters, tending to retrogress towards milkiness; not as good as 28A, 29A and 30A. |

[1] Higher dosages were not given at 120° C. in view of excessive blistering

From the above, it is evident that the initial dosage at room temperature for sheets 0.140" to 0.170" thick should be no less than about 52×10⁶ R. E. P. and, for best results, need be no more than about 76×10⁶ R. E. P., and that the final dose at 120° C. should be no less than about 50×10⁶ R. E. P., and need be no more than 76×10⁶ R. E. P. The final transparency of sample 28A was a shade better than sample 30A. That of sample 29A was the best. Sample 31A was irradiated too far initially for best results, the molecular arrangement fixed, as it were, during the initial irradiation at room temperature was loath to conform to the new setting brought about at the final dosage at 120° C. The initial and final dosage should be equal, or preferably, the final dose should exceed the initial dose. The initial dosage minimum is about 52×10⁶ R. E. P. Crystal clarity should be evidenced, free of bubble disfigurement, when the initial dosage is about 56×10⁶ R. E. P., and the final dosage is about 76×10⁶ R. E. P. It is advisable that the total amount of irradiation be kept below 200×10⁶ R. E. P. for, at this dosage, polyethylene assumes a permanent amber tint.

After the source of heat was removed from the polyethylene sheets, which were irradiated in the hot clear state subsequent to irradiation at room temperature, and were in process of cooling, a strange phenomenon occurred. The crystal clarity gave way to deep milkiness which, in turn, reshifted to transparency. It appeared that opposing forces were at work as the sheet began to increase in density, as a result of shrinking, in view of declining temperature, which tended to move the molecules from their quasi fixed position, causing opacity to develop momentarily but, as the whole settled down in temperature, returned for the most part to their newly acquired position which was permanently established by irradiation in the hot clear condition.

*Example IV*

To conserve irradiation time and cost, and still produce clear, transparent polyethylene, a sheet of approximately 0.170" thickness was irradiated at 20×10⁶ R. E. P. at room temperature, heated beyond its clear point to approximately 145° C. and then chilled in ice water to develop limited transparency. The sample was then irradiated at room temperature while in the cold relatively clear state at 32×10⁶ R. E. P. to fix its cold clear point temporarily, and then heated to its hot clear point and then irradiated at 50×10⁶ R. E. P. and cooled slowly to room temperature. The result was a noticeable improvement over the procedure recited in Example III.

*Example V*

Example IV was repeated but the final cooling was done by quenching to room temperature to give comparable results.

Ozone has an adverse effect upon polyethylene. Consequently, it is frequently desirable to have good ventilation or to carry out the irradiation while the polymer is in an atmosphere of an inert gas, such as nitrogen or argon. Thus, the process in Example I(*b*) can be carried out while continuously passing a stream of argon over the polyethylene.

It is also possible to carry out the irradiation while the polyethylene is maintained in a vacuum, e. g., 1 mm. or less. Thus, Example I(*a*) can be carried out while the polyethylene is in a vacuum of 0.1 mm. total pressure.

While the irradiation is preferably carried out with electrons, as set forth above, it is also possible to use other means of irradiation. Thus, if the tungsten target is put back, the machine described in Example I will permit X-rays to hit the polyethylene by placing the polymer by the side of the target. However, irradiation with X-rays takes longer than with electrons to obtain the same effect. It is also possible to irradiate with β-rays, e. g., by employing cobalt 60, carbon 14, phosphorus 32, or strontium 90, as a source of irradiation. Gamma-rays can be used, e. g., by submitting the polyethylene to irradiation from iron 59 or cobalt 60. Neutrons protons, α-particles and deuterons also may be employed to bombard the polyethylene. The effects of irradiation, developed by different sources of atomic energy, are one of degree rather than of kind.

Instead of using the Van de Graff electrostatic generator as the source of the electron beam, other sources of high energy electrons can be employed, such as the General Electric 800,000 volt resonant transformer unit described by Lawton et al. in Industrial and Engineering Chemistry, vol. 46, pages 1703 to 1709. Thus, the method described on page 1703, first column, under "Experimental," could be repeated, using DYNK polyethylene (mol. wt. 25,000) and a sample thickness of 40 mils with the modification that, instead of irradiating cold, as in the article, irradiation was carried out at the transition point of the polyethylene for 30 seconds and then the sample was quickly quenched in ice water.

As previously set forth, a process, such as that described in the Lawton article, will not produce a clear polyethylene, as irradiation can only accomplish this result when the polyethylene is transparent at the time of treatment and Lawton treats conventional translucent polyethylenes at room temperature.

There can also be employed other conventional apparatus for producing beams of electrons, such as those recited, for example, in Brophy Patent No. 2,668,133, column 3, lines 5 to 29.

As previously pointed out, for best results, the irradiation dose should be about 20×10⁶ R. E. P. as a minimum and the polyethylene should have a molecular weight before irradiation of about 20,000 or above. With polyethylene having a molecular weight of 7,000, it is necessary to employ a dosage of at least 100×10⁶ R. E. P., in order to get satisfactory cross-linking and even higher dosages are necessary for lower molecular weight polymers. Correspondingly, lower dosages can be employed to obtain cross-linking of higher molecular weight polymer.

As still another embodiment of the present invention, the polyethylene, e. g., of molecular weight 28,000, can be formed into shape, e. g., as a beaker, in the conventional manner and then irradiated and further treated in accordance with the procedure recited in Example IV, to produce a clear, transparent article.

Similarly, other articles, such as bottles, closures, etc., can be formed into shape in the conventional manner, irradiated, and then made clear and transparent by following the procedures outlined in Examples III, IV or V.

The transparent polyethylene can be formed into valuable products in any of the conventional ways employed with customary translucent polyethylene, such as by making blown films or extruding films for packaging purposes, casting, vacuum molding, pressure molding, injection molding or even by punching articles, e. g., cap liners or ring gaskets, from blanks.

The transparent polyethylene of the present invention can be employed in many instances where clear vinyl resins or acrylates and methacrylates are now used. The new polyethylene is of particular advantage, due to its increased strength and resistance to elevated temperatures.

Figure 2:
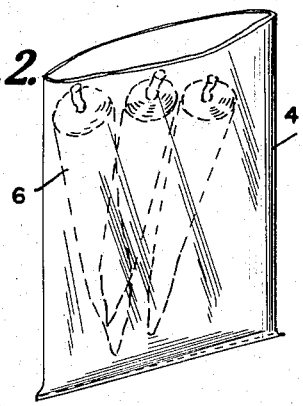
Figure 3:
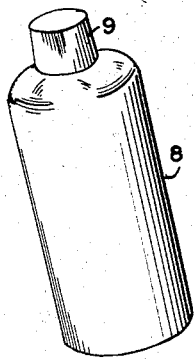
Figure 4:
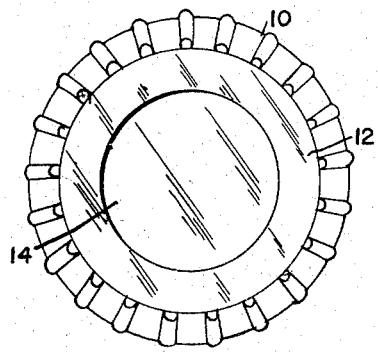
Figure 5:
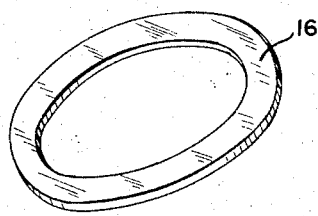

Typical uses for the new transparent polyethylene are disclosed in the drawings, wherein:

Figure 1 is a perspective view of a box;
Figure 2 is a perspective view of a flexible bag;
Figure 3 is a perspective view of a squeeze bottle;
Figure 4 is a bottom view of a crown cap, and
Figure 5 is a perspective view of a ring gasket.

Referring more specifically to the drawings, in Figure 1, there is shown a box 2, made of the transparent polyethylene of the present invention. The box can be used, for example, as a silverware container.

In Figure 2, there is shown a flexible bag 4, made of transparent polyethylene. Such bags are particularly desirable for displaying food products, designated generically at 6, in grocery stores, as the customer desires to see the product before buying. Thus, there can be packaged vegetables, such as carrots and lettuce, or meats, such as turkey, or candies or even ice cream.

The transparent polyethylene also can be used to replace the conventional translucent polyethylene in making a squeeze bottle 8 and cap 9 with enhanced esthetic values. Such bottles also can be used in place of tin cans or glass jars. If desired, although this is not ordinarily preferred, the transparent polyethylene can be tinted with organic dyestuffs to give color to bottles, and other products, which retain their transparent characteristics.

The transparent polyethylene also can be molded into cap liners, such as the linear 12 in crown cap 10. It is possible to provide such liners with a central recess, as shown at 14. In addition, the transparent polyethylene can be formed into a ring gasket 16, and advantage taken of the transparency, e. g., in building working models of machines, where it is desired to see the entire operation.

It is also possible to sterilize articles packaged in transparent polyethylene containers, such as the bag 4 and the bottle 8, by submitting the package to heat sterilization, e. g., a bottle formed from polyethylene having a thickness of 45 mils could have the articles therein sterilized by submitting the package to a temperature of 58 to 60° C. for 24 hours. Also, higher temperatures can be employed for shorter periods of time, e. g., 110° for 5 minutes, on three consecutive days to kill spores.

The transparent polyethylene is especially desirable for use as liners with caps for wide mouthed containers, as the interior of the cap may be decorated and observed through the liner because of the transparency of the latter. The new polyethylene of the present invention can also be used in coatings and other coverings.

The uses recited above are not exhaustive, but are illustrative only and in no way limit the invention.

We claim:

1. A process comprising heating polyethylene to at least about 105° C., irradiating the hot polymer for a time sufficient to impart a dosage of between about $2 \times 10^6$ REP and $200 \times 10^6$ REP to obtain a product having increased permanent transparency, said irradiation being carried out with high energy irradiation equivalent to at least 750,000 electron volts, and thereafter cooling the irradiated polymer.

2. The process of claim 1, in which the cooling is done slowly.

3. The process of claim 1, in which the cooling is accomplished by quenching.

4. The process of claim 1, wherein the irradiated polyethylene is shaped while in the transparent state at a temperature at least as high as the softening temperature of the initial polyethylene and is thereafter cooled to form an article retaining the said shape.

5. The process of claim 1, in which the product after irradiation is formed into pellets and the pellets are subsequently reheated and formed into a transparent object having a new shape, the irradiation being carried out to a dosage of at least about $20 \times 10^6$ REP.

6. A process according to claim 1, wherein the irradiation is carried out with electrons at a dosage between about $6 \times 10^6$ REP and $100 \times 10^6$ REP.

7. A process according to claim 1, wherein the dosage is about $20 \times 10^6$ REP.

8. A process according to claim 1, wherein the irradiation is carried out with electrons at a dosage between about $50 \times 10^6$ and $100 \times 10^6$ REP.

9. A process according to claim 1, wherein the irradiation is carried out with electrons at a dosage between about $1 \times 10^6$ and $50 \times 10^6$ REP, and the polyethylene has a thickness between about 3 and 250 mils.

10. A process according to claim 9, wherein the polyethylene has a molecular weight of at least 12,000.

11. A process according to claim 10, wherein the polyethylene has a molecular weight of about 20,000.

12. A process according to claim 11, wherein the polyethylene has a thickness of about 40 to 50 mils.

References Cited in the file of this patent

Charlesby: (I) "Proceedings Royal Soc.," London (November-December 1952), vol. 215A, pages 187–212.

Charlesby: (II) "Nucleonics" (June 1954), pages 18–25.

Sun: "Modern Plastics," vol. 32 (September 1954), page 229. Entire article includes pages 141–144, 146, 148, 150, 229–233, 236–238.